(12) United States Patent
Choi et al.

(10) Patent No.: US 6,724,709 B2
(45) Date of Patent: Apr. 20, 2004

(54) DISC CARTRIDGE AND SYSTEM

(75) Inventors: Han-kook Choi, Gyeonggi-do (KR); Yong-hoon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/987,888

(22) Filed: Nov. 16, 2001

(65) Prior Publication Data

US 2002/0181381 A1 Dec. 5, 2002

(30) Foreign Application Priority Data

May 30, 2001 (KR) ........................................ 2001-30081

(51) Int. Cl.[7] .................. G11B 33/02; G11B 3/70; G11B 5/84; G11B 7/26; G11B 23/03
(52) U.S. Cl. ................ 369/77.2; 369/272; 360/133
(58) Field of Search ................ 369/77.2, 272, 369/287, 289, 292, 131, 132, 133; 360/131, 132, 133; D14/480, 479, 478, 474

(56) References Cited

U.S. PATENT DOCUMENTS

| | | | | |
|---|---|---|---|---|
| 1,496,258 A | * | 6/1924 | Ewing | 369/272 |
| 4,138,703 A | * | 2/1979 | Stave et al. | 206/244 |
| 4,205,853 A | * | 6/1980 | Torrington | 206/308.3 |
| 4,206,926 A | * | 6/1980 | Stave | 206/308.3 |
| 4,419,710 A | * | 12/1983 | Sugiyama et al. | 206/308.3 |
| 4,812,633 A | * | 3/1989 | Vogelgesang et al. | 235/487 |
| 5,435,246 A | * | 7/1995 | Edman | 101/333 |
| 5,537,389 A | * | 7/1996 | Kuwa et al. | 360/133 |
| 5,646,807 A | * | 7/1997 | Ohnuki et al. | 360/133 |
| 5,677,898 A | * | 10/1997 | Hasegawa et al. | 206/308.3 |
| 5,761,015 A | * | 6/1998 | Oishi | 360/133 |
| 5,963,537 A | * | 10/1999 | Fujisawa | 369/291 |
| D420,337 S | * | 2/2000 | Mori | D14/480 |
| 6,307,743 B1 | * | 10/2001 | Aizawa et al. | 361/683 |
| 6,411,597 B1 | * | 6/2002 | Nishino et al. | 369/291 |

* cited by examiner

*Primary Examiner*—Julie Anne Watko
(74) *Attorney, Agent, or Firm*—Staas & Halsey LLP

(57) ABSTRACT

A disc cartridge including a case to form a space in which a disc is received, and a shutter to selectively open and shut an aperture formed on the case, wherein the aperture is formed only one side of the case. The size of the aperture of the disc cartridge can be reduced by half while the shutter is open, which will remarkably reduce pollution of the disc by foreign substances such as dust.

15 Claims, 5 Drawing Sheets

DISC CARTRIDGE AND SYSTEM

CROSS-REFERENCE TO RELATED APPLICATIONS

This application claims the benefit of Korean Application No. 2001-30081, filed May 30, 2001, in the Korean Industrial Property Office, the disclosure of which is incorporated herein by reference.

BACKGROUND OF THE INVENTION

1. Field of the Invention

The present invention relates to a disc cartridge to receive an information recording/reproducing medium such as a disc, and more particularly, to a disc cartridge which is highly resistant to dust.

2. Description of the Related Art

As shown in FIGS. 1 and 2, a known disc cartridge 10 receives a disc D to be used in an information recording/reproducing apparatus 100. The disc cartridge 10 includes upper and lower cases 11 and 12 spaced to receive the disc D. A holder 13 is inserted into and is combined with the upper and lower cases 11 and 12 and holds the disc D. A shutter 14 selectively opens and shuts apertures 11a and 12a, which are formed on the upper and lower cases 11 and 12, respectively, so that a pickup 130 of the information recording/reproducing apparatus 100 can access the disc D. Here, the reference numerals 11b and 12b denote receiving holes that are formed to be connected with the apertures 11a and 12a, so that a clamping domain D1 of the disc D can be clamped by a turntable 110 of the information recording/reproducing apparatus 100 and a damper 120. The receiving holes 11b and 12b and the apertures 11a and 12a are open or shut by opening or shutting the shutter 14. Reference numerals 11c and 12c denote locking grooves that are formed on the upper and lower cases 11 and 12, respectively, to hook a locking projection 13a that is formed on the holder 13. When combining the holder 13 with the cases 11 and 12, the locking projection 13a is elastically hooked into the locking grooves 11c and 12c. The locking projection 13a is slipped out of the locking grooves 11c and 12c by pressing and pulling a pressing unit 13b, which is extended past the locking projection 13a, so that the holder 13 is pulled from the locking grooves 11c and 12c.

The information can be recorded on both sides of the disc D, as well as on a single side. For this reason, the disc cartridge 10 is formed so that the upper and lower cases 11 and 12 are symmetrical to each other, thereby allowing both sides of the disc D to be used. In other words, as shown in FIG. 2, the apertures 11a and 12a and the receiving holes 11b and 12b are identical and are formed symmetrically on the upper and lower cases 11 and 12, so that the pickup 130 can access one side of the disc D or the other side of the disc D by turning the cartridge 10 upside down.

The disc D is used while being stored in the cartridge 10 in order to protect the disc D from foreign substances such as dust. That is, a foreign substance such as dust can attach itself to the surface of the disc D, which can obstruct accurate signal processing during recording and reproducing operations, especially in the case of a high-density disc. However, it is inevitable that dust will enter the cartridge 10 through the upper and lower apertures 11a and 12a, because the shutter 14 must be open for access of the pickup 130 during information recording or reproducing operations, as described above. Even though an aperture 11a or 12a of the unused side of the disc D is not accessed by the pickup 130, dust nevertheless passes through the unused aperture.

SUMMARY OF THE INVENTION

To solve the above problems, it is an object of the present invention to provide an improved disc cartridge which is highly resistant to dust.

Additional objects and advantages of the invention will be set forth in part in the description which follows and, in part, will be obvious from the description, or may be learned by practice of the invention.

Accordingly, to achieve the above and other objects, there is provided a disc cartridge including a case to form a space in which a disc is received and a shutter to selectively open and shut an aperture formed on the case, wherein the aperture is formed on only one side of the case.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
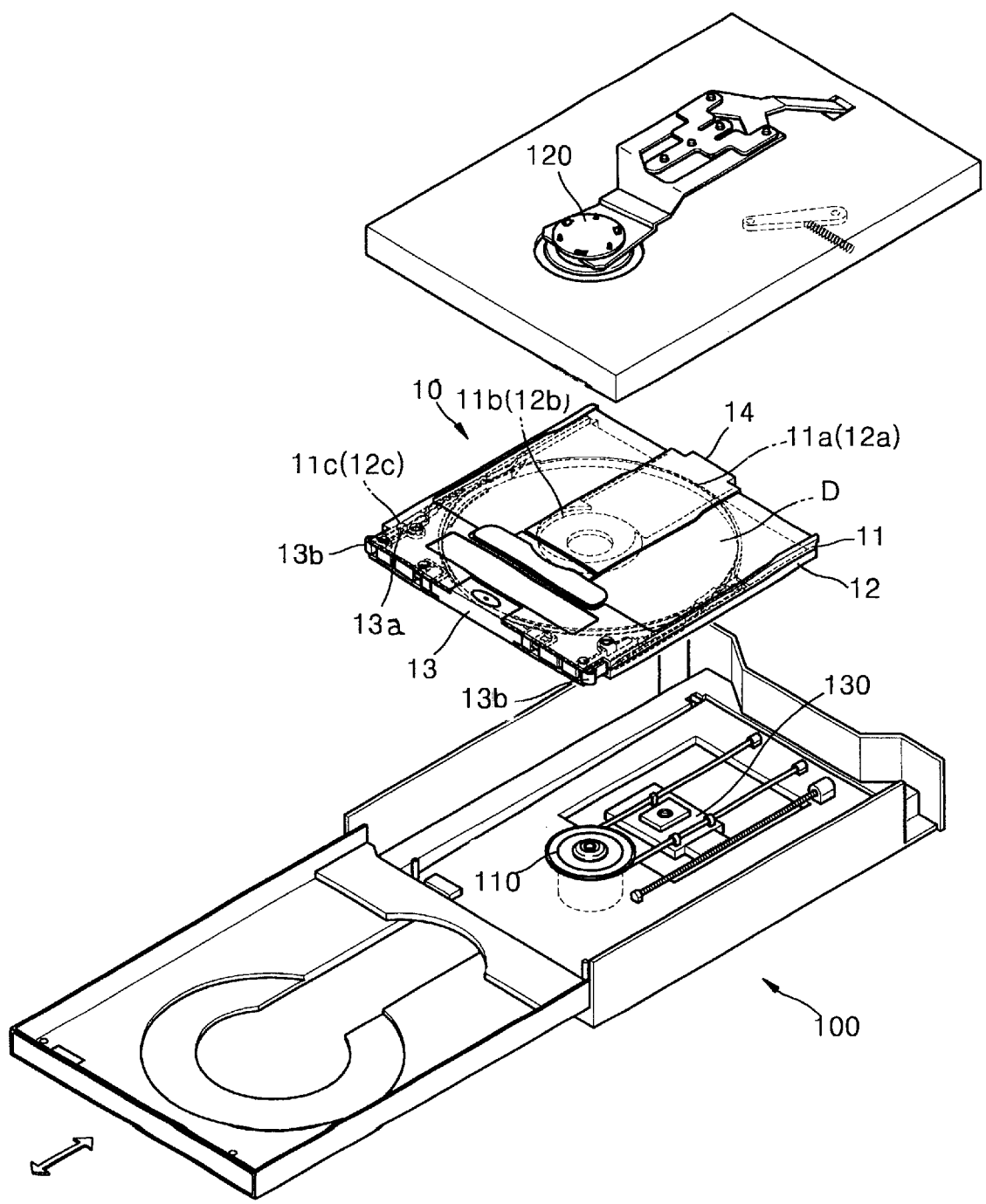
FIG. 1 illustrates a conventional disc cartridge attached to an information recording and reproducing apparatus.
Figure 2:
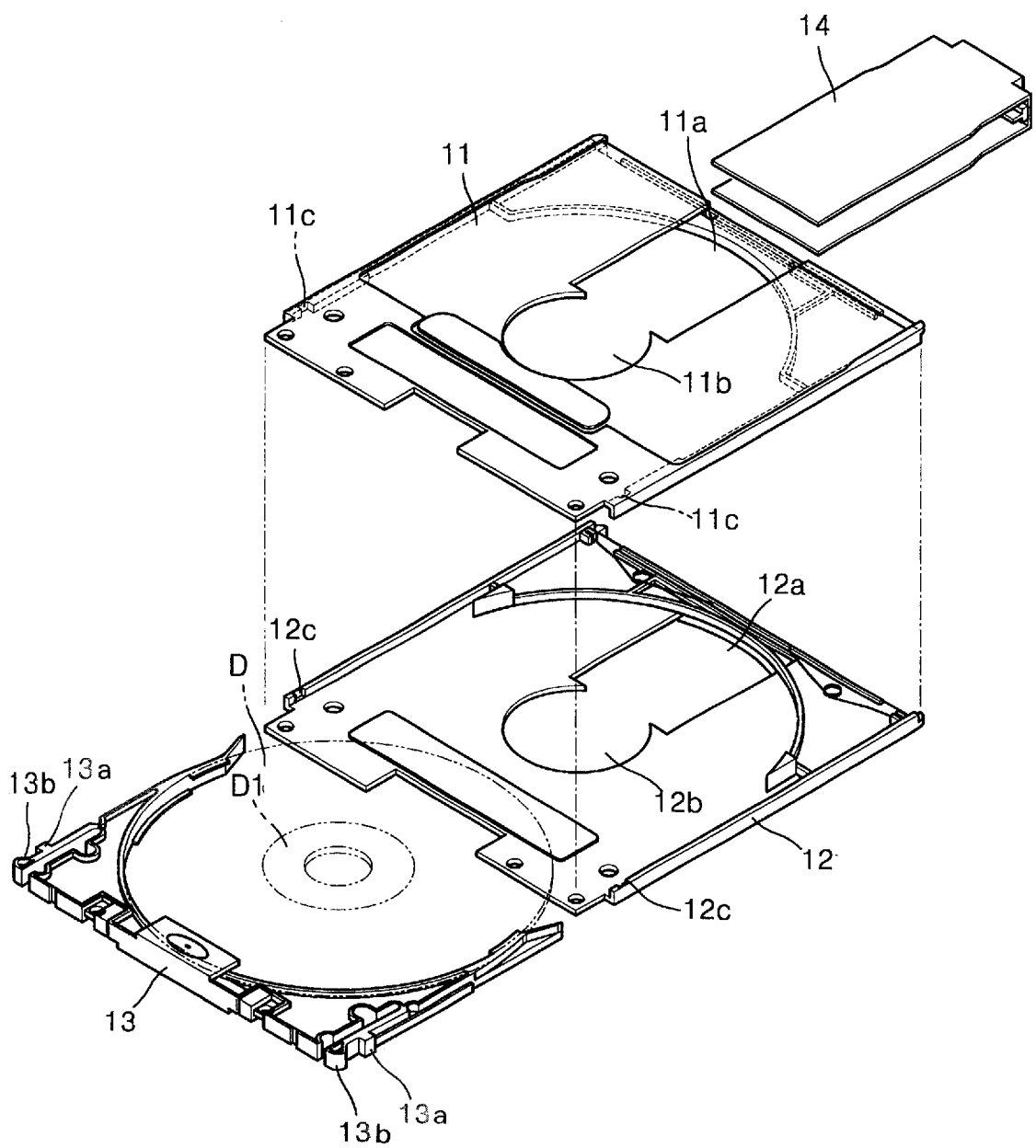
FIG. 2 is an exploded perspective view illustrating the disc cartridge shown in FIG. 1.

Reference will now be made in detail to the present preferred embodiments of the present invention, examples of which are illustrated in the accompanying drawings, wherein like reference numerals refer to like elements throughout.

Figure 3:
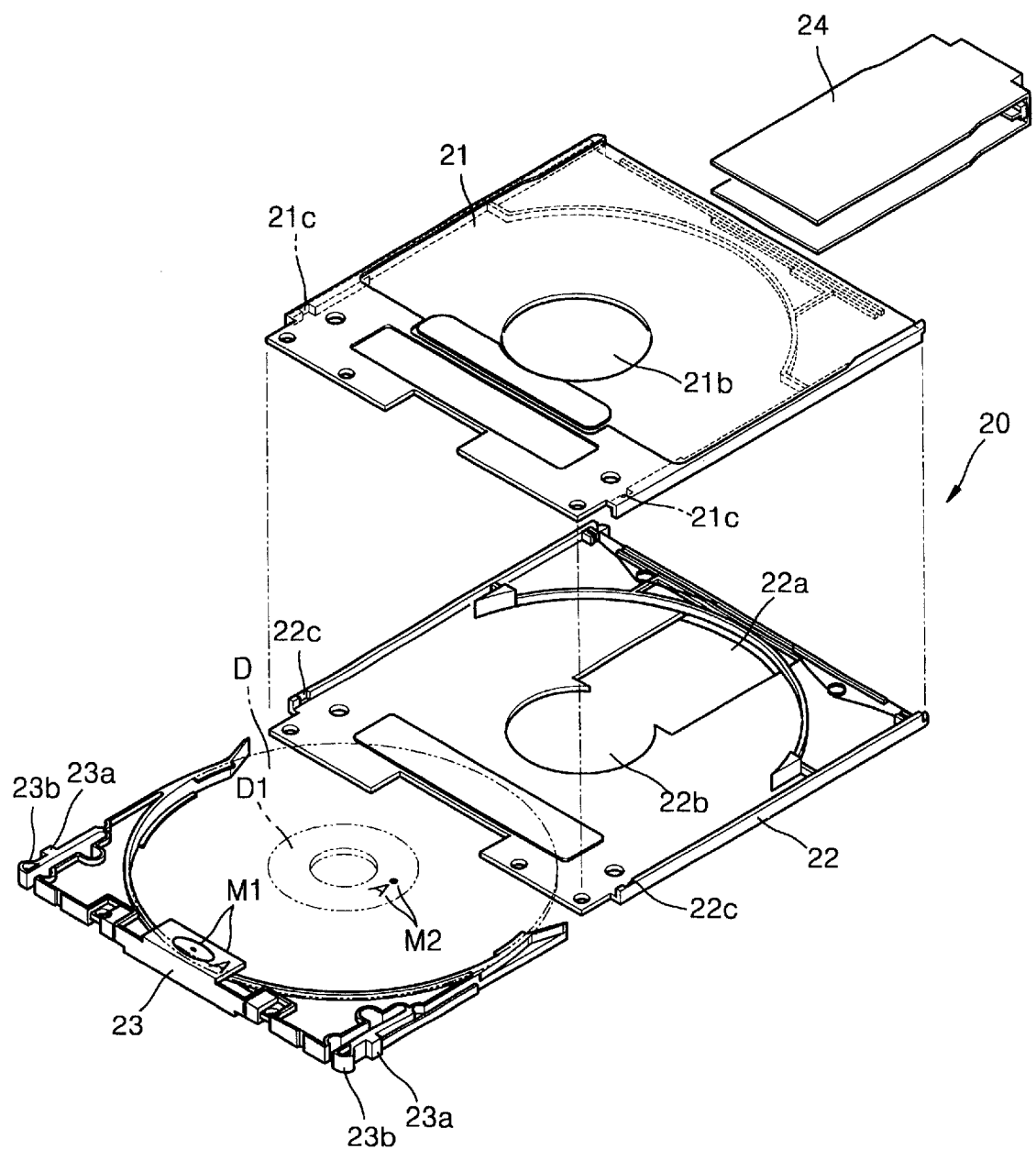
FIG. 3 is an exploded perspective view illustrating a disc cartridge according to the present invention.
Figure 4:
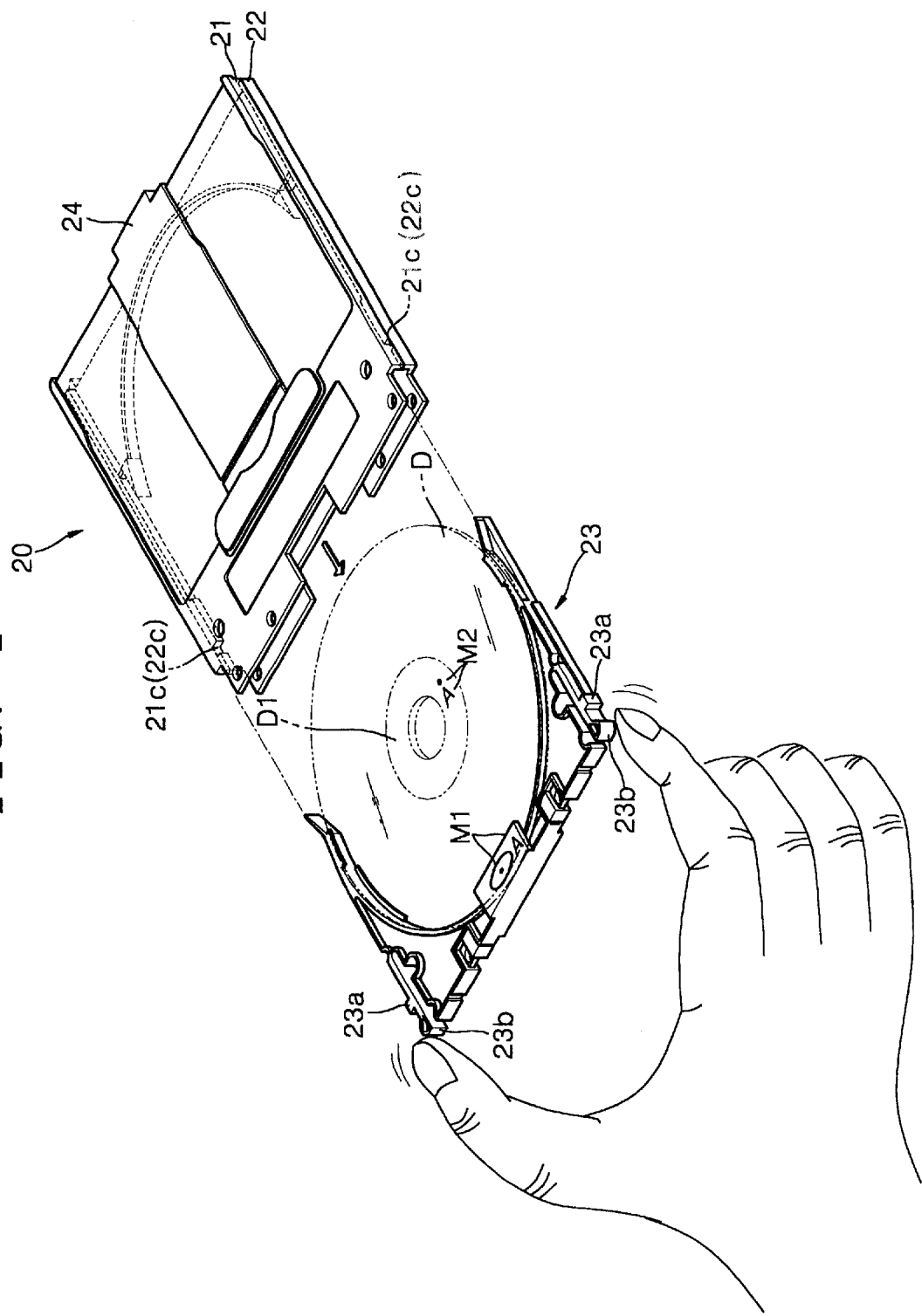
FIGS. 4 and 5 are perspective views illustrating processes of changing sides of a disc with the disc cartridge shown in FIG. 3.
Figure 5:
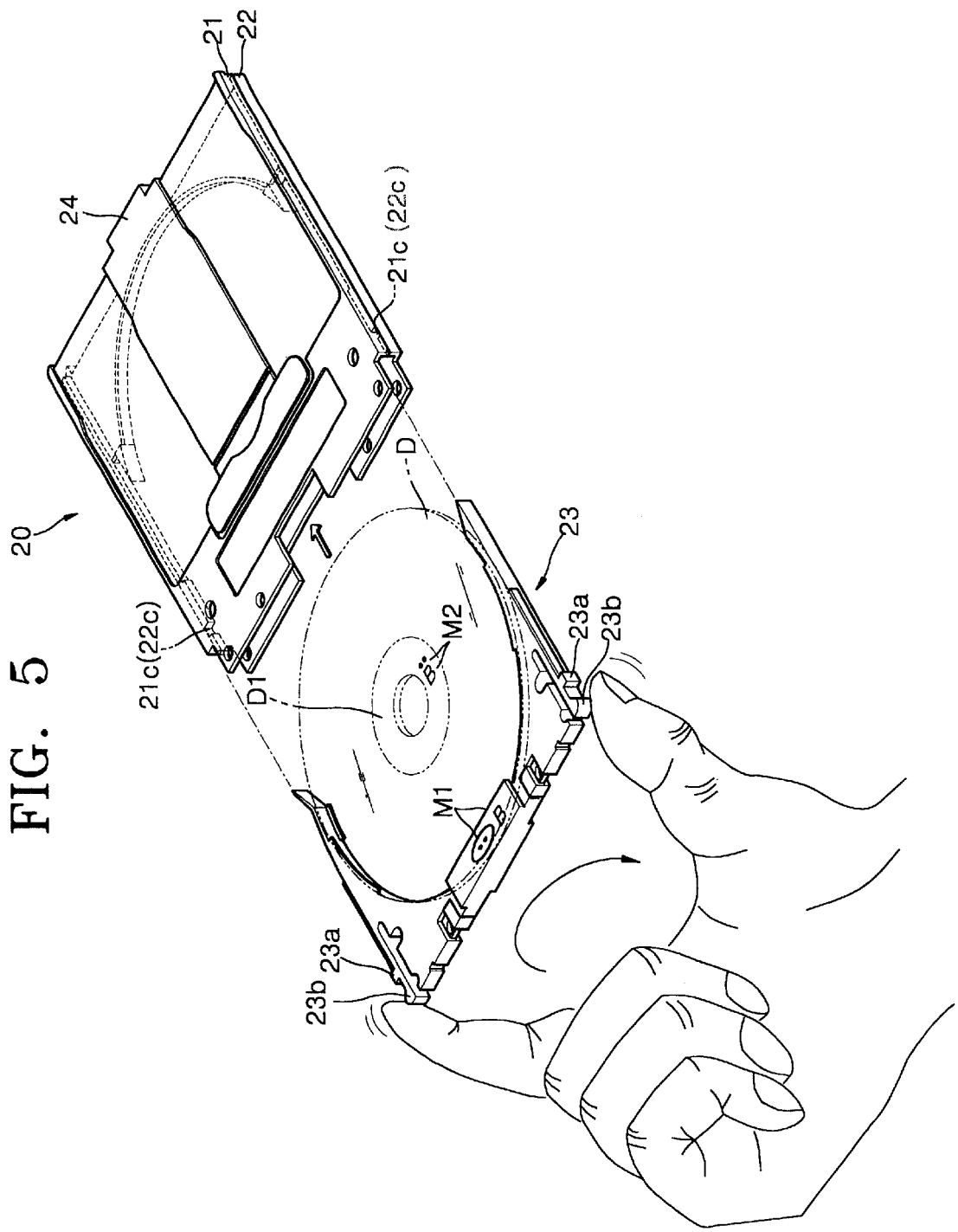

FIGS. 3 through 5 illustrate a disc cartridge 20 according to the present invention. Referring to FIG. 3, the disc cartridge 20 includes upper and lower cases 21 and 22 to form a space in which a disc D is received and a holder 23 that is inserted into and combined with the upper and lower cases 21 and 22 while holding the disc D, so that the disc D is positioned in the space between the cases 21 and 22. The disc cartridge 20 further includes a shutter 24 that selectively opens and shuts an aperture 22a and receiving holes 21b and 22b. Reference numerals 21c and 22c denote locking grooves that are formed on the upper and lower cases 21 and 22 to hook a locking projection 23a, which is formed on the holder 23. When combining the holder 23 with the upper and lower cases 21 and 22, the locking projection 23a is elastically hooked into the locking grooves 21c and 22c. Also, the locking projection 23a is slipped out of the locking grooves 21c and 22c by pressing and pulling a pressing unit 23b that is extended to the locking projection, and, finally, the holder 23 is pulled from the locking grooves 21c and 22c.

Here, the aperture 22a is formed on only one of the sides of the disc cartridge 20. That is, the aperture 22a and the receiving hole 22b are formed on the lower case 22, whereas only the receiving hole 21b is formed on the upper case 21. For this reason, when the holder 23 is combined with the upper and lower cases 21 and 22, a side of the disc D to be used must be inserted to face the lower case 22 in which the aperture 22a and the receiving hole 22b are formed.

When the disc cartridge 20 is used in the information recording/reproducing apparatus 100 (refer to FIG. 1), the aperture 22a on a side of the disc D that is to be used and accessed by the pickup 130 (refer to FIG. 1), is open when the shutter 24 is open. However, the opposite side of the disc D is sealed up, except for the receiving hole 21b. Furthermore, the receiving hole 21b is not completely open, because it is combined with the damper 120 shown in FIG.

1, which is almost the same size as the receiving hole 21b, according to the clamping of the disc D. Therefore, if information is recorded on or reproduced from the disc D, a minimal amount of dust enters through the unused side of the disc D. Compared to the conventional disc cartridge 10, the size of the aperture 22 of the disc cartridge 20 of the present invention, which is open to the outside during information recording and reproducing, can be reduced by almost half. Accordingly, there is a lower possibility for dust to come into the disc cartridge 20 and thus errors can be reduced during signal processing.

When a side of the disc D is changed, the holder 23 that is combined with the upper and lower cases 21 and 22 must be pulled therefrom, as shown in FIG. 4. To do this, the locking projection 23a can be slipped out of the locking grooves 21c and 22c by pressing the pressing unit 23b of the holder 23. Thereafter, the holder 23 is turned upside down and then is combined with the upper and lower cases 21 and 22, as shown in FIG. 5. According to the above-described methods, the other side of the disc D faces the lower case 22 where the aperture 22a of the disc cartridge 20 is formed, whereas the already used side of the disc D faces the upper case 21 having no aperture. Therefore, if the disc cartridge 20 is mounted in the information recording/reproducing apparatus 100 shown in FIG. 1, an unused side of the disc D is accessed by the pickup 130 (shown in FIG. 1) via the aperture 22a when the shutter 24 is open, and finally, information is recorded on or reproduced from the side of the disc D. Consequently, both sides of the disc D can be used and, further, dust coming through the unused side can be suppressed.

In the disc cartridge 20 according to the present invention, the disc D must be pulled out of and then inserted into the upper and lower cases 21 and 22 every time a side of the disc D to be used is changed between front and rear sides thereof. In order to avoid confusion between the front and rear sides of the disc D, the holder 23 may contain an identification mark M1 using Braille or characters, which will help distinguish the front side of the disc D from the rear side. Furthermore, the holder 23 and the disc D are configured to have matching identification marks M1 and M2. Thus, if the disc D falls on the floor, a user will not be confused with the front and rear sides of the disc D by checking whether the mark M1 corresponds to the mark M2. The area where the marks M1 and M2 are indicated is the clamping domain D1 rather than a recording domain, and the marks M1 and M2 are sharply dented forms, as opposed to projected forms, so that there is no interference with the damper 120 (shown in FIG. 1).

As described above, while the shutter 24 is open, the size of the aperture 22a of the disc cartridge 20 of the present invention can be reduced by half compared to that of the conventional disc cartridge 10, which will remarkably reduce pollution of the disc D by foreign substances such as dust.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A disc cartridge to receive a disc having a portion to store information thereon, comprising:
    a case to form a space in which the disc is received, and comprising an aperture formed on only one side thereof; and
    a shutter disposed on an outside of the case to selectively open and shut the aperture formed on the case,
    wherein the disc comprises a dent formed thereon to identify a side of the disc.

2. The disc cartridge of claim 1, further comprising a holder inserted into the case, the holder holding and positioning the disc in the space formed in the case.

3. The disc cartridge of claim 2, wherein the holder and the disc each further comprise an identification mark to distinguish a front side of the disc from a rear side of the disc.

4. A system comprising:
    a recording and reproducing apparatus; and
    a disc, the disc comprising
        a recording domain on which information is recorded, and
        a clamping domain to clamp the information recording and reproducing apparatus to the disc,
        the clamping domain comprising a dent to distinguish a front side of the disc from a rear side of the disc.

5. A disc cartridge to receive a disc having a portion to store information thereon, comprising:
    a case, comprising
        a first case portion having an aperture opposite the portion to store information, and
        a second case portion, opposite the first case portion to define a space therebetween, the second case portion having a solid portion opposite the aperture; and
    a shutter to selectively open and shut the aperture, the shutter comprising first and second shutter portions opposite the aperture on respective outsides of the first and second case portions.

6. The disc cartridge of claim 5, wherein the second portion has no aperture.

7. The disc cartridge of claim 6, further comprising a holder to hold the disc, the holder being inserted and removed from the space.

8. The disc cartridge of claim 7, wherein the holder further comprises a locking projection, and the case comprises a locking groove to receive the locking projection to lock the holder into the case.

9. The disc cartridge of claim 8, wherein the holder further comprises a pressing unit to unlock the holder from the case.

10. A system comprising:
    a disc, comprising:
        a clamping portion, and
        an information portion;
    a recording/reproducing apparatus to record/reproduce information to/from the information portion of the disc, comprising:
        a clamp to clamp the clamping portion, and
        a pickup to access the information portion; and
    a cartridge to receive the disc, the cartridge comprising:
        a case, comprising
            a first portion having a first hole to receive the clamp, and an aperture, the pickup accessing the information portion through the aperture, and
            a second portion, opposite the first portion to define a space therebetween, the second portion having a second hole to receive the clamp, and a solid portion opposite the aperture, and
            a shutter disposed on an outside of the case to selectively open and shut the aperture and the first and second holes.

11. The system of claim 10, wherein the second portion has no aperture.

12. The system of claim 11, wherein the disc cartridge further comprises a holder to hold the disc, the holder being inserted into and removed from the space.

13. The system of claim 12, wherein the disc comprises an identification mark to identify a front side of the disc.

14. The system of claim 10, wherein the disc comprises:
  a recording domain on which information is recorded to/from the disc, the aperture exposing the recording domain to the recording/reproducing apparatus, and
  a clamping domain to clamp the recording/reproducing apparatus to the disc.

15. A system comprising:
  a disc
  a recording/reproducing apparatus to record/reproduce information to/from the disc; and
  a cartridge to receive the disc, the cartridge comprising a case, comprising
    a first portion having an aperture, the recording/reproducing apparatus accessing the disc through the aperture, and
    a second portion, opposite the first portion to define a space therebetween, the second portion having a solid portion opposite the aperture, and
  a shutter to selectively open and shut the aperture, wherein the second portion has no aperture, wherein the disc cartridge further comprises a holder to hold the disc, the holder being inserted into and removed from the space, the disc comprises an identification mark to identify a front side of the disc, and
  the identification mark comprises a dent formed on the disc.

* * * * *